(12) United States Patent
Maeda et al.

(10) Patent No.: US 10,711,128 B2
(45) Date of Patent: Jul. 14, 2020

(54) MODIFIED POLYVINYL ACETAL RESIN COMPOSITION

(71) Applicant: SEKISUI CHEMICAL CO., LTD., Osaka (JP)

(72) Inventors: Takayuki Maeda, Shiga (JP); Kenji Yamauchi, Yamaguchi (JP); Shiori Tateno, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 32 days.

(21) Appl. No.: 15/743,390

(22) PCT Filed: Sep. 30, 2016

(86) PCT No.: PCT/JP2016/078985
§ 371 (c)(1),
(2) Date: Jan. 10, 2018

(87) PCT Pub. No.: WO2017/057663
PCT Pub. Date: Apr. 6, 2017

(65) Prior Publication Data
US 2018/0194935 A1    Jul. 12, 2018

(30) Foreign Application Priority Data
Sep. 30, 2015 (JP) ................................ 2015-194998

(51) Int. Cl.
| C08L 29/14 | (2006.01) |
| C08F 8/28 | (2006.01) |
| C08L 63/00 | (2006.01) |
| C09J 129/04 | (2006.01) |
| C09J 129/14 | (2006.01) |
| C09J 163/00 | (2006.01) |
| C08L 29/04 | (2006.01) |
| C08F 8/06 | (2006.01) |
| C08F 16/28 | (2006.01) |
| C08F 216/38 | (2006.01) |

(52) U.S. Cl.
CPC ............... *C08L 29/14* (2013.01); *C08F 8/28* (2013.01); *C08L 29/04* (2013.01); *C08L 63/00* (2013.01); *C09J 129/04* (2013.01); *C09J 129/14* (2013.01); *C09J 163/00* (2013.01); *C08F 8/06* (2013.01); *C08F 16/28* (2013.01); *C08F 216/38* (2013.01)

(58) Field of Classification Search
None
See application file for complete search history.

(56) References Cited

U.S. PATENT DOCUMENTS

| 2003/0130435 A1 | 7/2003 | Tanaka et al. |
| 2011/0300387 A1 | 12/2011 | Park et al. |
| 2015/0240067 A1 | 8/2015 | Nagai et al. |
| 2016/0214355 A1 | 7/2016 | Mikayama et al. |

FOREIGN PATENT DOCUMENTS

| CN | 102153936 | 8/2011 |
| CN | 102325852 | 1/2012 |
| CN | 102633944 | 8/2012 |
| CN | 103205224 | 7/2013 |
| CN | 104319420 | 1/2015 |
| CN | 104662085 | 5/2015 |
| EP | 0 461 399 | 12/1991 |
| EP | 1 429 400 | 6/2004 |
| EP | 2 360 207 | 8/2011 |
| EP | 2 979 864 | 2/2016 |
| JP | 55-139410 | 10/1980 |
| JP | 04-320476 | 11/1992 |
| JP | 6-212138 | 8/1994 |
| JP | 07-331187 | 12/1995 |
| JP | 11-199846 | 7/1999 |
| JP | 2000-328356 | 11/2000 |
| JP | 2001-098165 | 4/2001 |
| JP | 2001-254058 | 9/2001 |
| JP | 2002-517595 | 6/2002 |
| JP | 2008-531817 | 8/2008 |
| JP | 2011-502749 | 1/2011 |
| JP | 2013-72027 | 4/2013 |
| JP | 2015-108077 | 6/2015 |
| JP | 2015-199932 | 11/2015 |
| WO | 2014/157520 | 10/2014 |
| WO | 2015/046583 | 4/2015 |

OTHER PUBLICATIONS

Machine Translation of JP 2013072027 p. 1-7, Apr. 22, 2013.*
International Search Report dated Nov. 1, 2016 in International (PCT) Application No. PCT/JP2016/078985.
Extended European Search Report dated Apr. 8, 2019 in corresponding European Application No. 16851832.2.
International Search Report dated Nov. 15, 2016 in International (PCT) Application No. PCT/JP2016/078836 with English translation.
Extended European Search Report dated Apr. 8, 2019 in European Patent Application No. 16851753.0.

(Continued)

*Primary Examiner* — Robert T Butcher
(74) *Attorney, Agent, or Firm* — Wenderoth, Lind & Ponack, L.L.P.

(57) ABSTRACT

The present invention aims to provide a modified polyvinyl acetal resin composition that is excellent in storage stability, has high strength and excellent adhesiveness, and is capable of reducing occurrence of warping or peeling when used for bonding different materials. The present invention relates to a modified polyvinyl acetal resin composition containing: a modified polyvinyl acetal resin having a constitutional unit with an imine structure, and an epoxy resin.

8 Claims, No Drawings

(56) References Cited

OTHER PUBLICATIONS

LibreTexts, "Imine (Schiff Base) Formation," (https://chem.libretexts.org/Bookshelves/Organic_Chemistry/Book%3A_Organic_Chemistry_with_a_Biologicai_Emphasis_(Soderberg)/11%3A_Nucleophilic_carbonyl_addition_reactions/11.6%3A_Imine_(Schiff_base}_formation). (2019).

\* cited by examiner

MODIFIED POLYVINYL ACETAL RESIN COMPOSITION

TECHNICAL FIELD

The present invention relates to a modified polyvinyl acetal resin composition that is excellent in storage stability, has high strength and excellent adhesiveness, and is capable of reducing occurrence of warping or peeling when used for bonding different materials.

BACKGROUND ART

Polyvinyl acetal resin is synthesized from polyvinyl alcohol as a raw material, and has an acetyl group, a hydroxy group, and an acetal group in a side chain to show excellent toughness, adhesiveness, crosslinkability, and hygroscopicity. A variation in the ratio of side chain groups can change the resin properties. Owing to such properties, polyvinyl acetal resin is used in a wide range of applications including laminated glass interlayer films for automobiles and ceramic green sheets.

An attempt is now being made to improve resin properties and develop novel functions of polyvinyl acetal resin by introducing a functional group other than the acetyl group, hydroxy group, and acetal group into a side chain of the polyvinyl acetal resin.

Polyvinyl acetal resin however has an insufficient adhesion force to metal materials. In addition, a difference in degree of shrinkage between polyvinyl acetal resin and metal materials causes warping or peeling during heat treatment for curing.

Patent Literatures 1 to 4 disclose adhesives prepared using epoxy resin. These adhesives however exert only an insufficient adhesion force to metal materials because of the insufficient strength of the resin contained.

CITATION LIST

Patent Literature

Patent Literature 1: JP 2008-531817 T
Patent Literature 2: JP 2002-517595 T
Patent Literature 3: JP 2015-108077 A
Patent Literature 4: JP H06-212138 A

SUMMARY OF INVENTION

Technical Problem

The present invention aims to provide, in consideration of the state of the art, a modified polyvinyl acetal resin composition that is excellent in storage stability, has high strength and excellent adhesiveness, and is capable of reducing occurrence of warping or peeling when used for bonding different materials.

Solution to Problem

The present invention relates to a modified polyvinyl acetal resin composition containing: a modified polyvinyl acetal resin having a constitutional unit with an imine structure, and an epoxy resin.

The present invention is specifically described in the following.

As a result of intensive studies, the present inventors found out that a modified polyvinyl acetal resin having a constitutional unit with an imine structure can exhibit excellent crosslinkability when used together with an epoxy resin, providing a crosslinked product having sufficient strength. They also found out that such a resin composition used for bonding different materials has a lower degree of shrinkage to reduce warping or peeling. The present invention was thus completed.

The modified polyvinyl acetal resin composition of the present invention contains a modified polyvinyl acetal resin having a constitutional unit with an imine structure.

Due to the incorporation of such a modified polyvinyl acetal resin, the modified polyvinyl acetal resin composition also containing an epoxy resin can form a crosslinked structure between the modified polyvinyl acetal resin and the epoxy resin. The crosslinked product obtained by the crosslinking therefore has high mechanical strength and moderate elasticity. Moreover, when the resin composition is used for bonding different materials, shrinkage upon curing is slowed down to reduce warping due to a difference in degree of shrinkage of the materials or peeling of the bonded part.

The modified polyvinyl acetal resin has a constitutional unit with an imine structure.

The imine structure as used herein refers to a structure having a C=N bond.

The modified polyvinyl acetal resin preferably has an imine structure in a side chain. The imine structure may be directly bonded to carbon constituting the main chain of the modified polyvinyl acetal resin or bonded to the carbon via a linking group such as an alkylene group.

The state of having the imine structure in a side chain includes a state of having the imine structure in a graft chain of the modified polyvinyl acetal resin.

Examples of the constitutional unit with an imine structure include a constitutional unit represented by the following formula (1):

wherein $R^1$ is a single bond or an alkylene group, and $R^2$ is a group having an imine structure.

In the formula (1), when $R^1$ is an alkylene group, the lower limit of the carbon number of the alkylene group is preferably 1, and the upper limit thereof is preferably 12. When the carbon number of the alkylene group is more than 12, the optimum strength may not be achieved. When $R^1$ is an alkylene group, the upper limit of the carbon number of the alkylene group is more preferably 5.

In the formula (1), when $R^1$ is an alkylene group, examples of the alkylene group include linear alkylene groups such as methylene, ethylene, trimethylene, tetramethylene, pentamethylene, hexamethylene, octamethylene, and decamethylene groups; branched alkylene groups such as methyl methylene, methyl ethylene, 1-methyl pentylene, and 1,4-dimethyl butylene groups; and cyclic alkylene groups such as cyclopropylene, cyclobutylene, and cyclohexylene groups. Preferred among these are linear alkyl groups such as methylene, ethylene, n-propylene, and n-butylene groups, and more preferred are methylene and ethylene groups.

R² may be, for example, a functional group represented by the following formula (2):

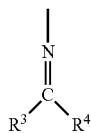

(2)

wherein R³ is a hydrogen atom or a C1-C18 hydrocarbon group and R⁴ is a C1-C18 hydrocarbon group.

Examples of the hydrocarbon groups include saturated hydrocarbon groups, unsaturated hydrocarbon groups, and aromatic hydrocarbon groups. The hydrocarbon groups may consist of only one type of hydrocarbon groups selected from the saturated hydrocarbon group, unsaturated hydrocarbon group, and aromatic hydrocarbon group, or two or more types of these hydrocarbon groups.

Examples of the saturated hydrocarbon groups include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these are methyl, ethyl, n-propyl, and n-butyl groups.

Examples of the aromatic hydrocarbon groups include phenyl, toluyl, xylyl, t-butyl phenyl, and benzyl groups.

In the constitutional unit with an imine structure in the modified polyvinyl acetal resin, preferably, R¹ is a single bond, R³ is a hydrogen atom, a methyl group, or an ethyl group, and R⁴ is a methyl group or an ethyl group.

The lower limit of the amount of the constitutional unit with an imine structure in the modified polyvinyl acetal resin is preferably 0.1 mol %, and the upper limit thereof is preferably 20.0 mol %.

With the amount of the constitutional unit with an imine structure of 0.1 mol % or more, the viscosity stability over time is favorable. With the amount of the constitutional unit with an imine structure of 20.0 mol % or less, acetalization can proceeds sufficiently. The lower limit of the amount of the constitutional unit with an imine structure is more preferably 1.0 mol %, and the upper limit thereof is more preferably 15.0 mol %.

The modified polyvinyl acetal resin preferably further contains a constitutional unit with an amino group or an amide structure. Due to the incorporation of the constitutional unit with an amino group or an amide structure, the modified polyvinyl acetal resin can more readily form a crosslinked structure with the epoxy resin.

The modified polyvinyl acetal resin preferably has the amino group or amide structure in a side chain. The amino group or amide structure may be directly bonded to carbon constituting the main chain of the modified polyvinyl acetal resin or bonded to the carbon via a linking group such as an alkylene group. Moreover, the amino group may be either primary amine or secondary amine.

The state of having the amino group or amide structure in a side chain means a state of having the amino group or amide structure in a graft chain of the modified polyvinyl acetal resin.

In particular, the amino group is preferably —NH₂.

The amide structure as used herein refers to a structure having —C(=O)—NH—.

In particular, the constitutional unit with an amino group preferably has a structure represented by the following formula (3).

The constitutional unit with an amide group preferably has a structure represented by the following formula (4).

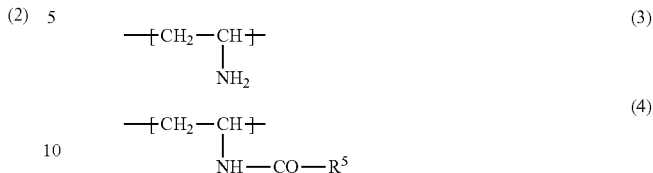

In the formula (4), R⁵ is a hydrogen atom or a C1-C10 hydrocarbon group.

Examples of the hydrocarbon group include alkyl, alkenyl, cycloalkyl, and cycloalkenyl groups.

The lower limit of the amount of the constitutional unit with an amino group or an amide structure is preferably 0.1 mol %, and the upper limit thereof is preferably 20 mol %.

With the amount of the constitutional unit with an amino group or an amide structure of 0.1 mol % or more, sufficient addition reactivity can be achieved. With the amount of 20 mol % or less, recovery of the modified polyvinyl acetal resin powder by precipitation is facilitated because an excessive increase in the solubility of the resin can be avoided. The lower limit of the amount is more preferably 0.5 mol %, and the upper limit thereof is more preferably 10 mol %. The amount of the constitutional unit with an amino group or an amide structure can be measured by NMR or the like.

The lower limit of the total amount of the constitutional unit with an amino group or an amide structure and the constitutional unit with an imine structure is preferably 0.1 mol %, and the upper limit thereof is preferably 20 mol %. The lower limit of the amount is more preferably 0.5 mol %, and the upper limit thereof is more preferably 10 mol %.

In the modified polyvinyl acetal resin, the content ratio between the constitutional unit with an imine structure and the constitutional unit with an amino group or an amide structure (constitutional unit with an imine structure/constitutional unit with an amino group or an amide structure) is preferably 0.5/99.5 to 99.5/0.5. With the ratio of 0.5/99.5 or more, sufficient viscosity stability over time can be achieved. With the ratio of 99.5/0.5 or less, crosslinkability can be sufficiently exhibited. The lower limit of the content ratio is more preferably 5/95, and the upper limit thereof is more preferably 75/25.

The degree of acetalization of the modified polyvinyl acetal resin is not particularly limited. The lower limit thereof is preferably 60 mol %, and the upper limit thereof is preferably 90 mol %. With the degree of acetalization of 60 mol % or higher, the modified polyvinyl acetal resin can be sufficiently precipitated in the synthesis process by a precipitation method. With the degree of acetalization of 90 mol % or lower, the solubility of the modified polyvinyl acetal resin into a solvent is favorable. The lower limit is more preferably 65 mol %, and the upper limit is more preferably 85 mol %. The degree of acetalization of the modified polyvinyl acetal resin can be measured by NMR or the like.

The modified polyvinyl acetal resin has a hydroxy group content of preferably 15 to 35 mol %, more preferably 17 to 25 mol %. With the hydroxy group content of 15 mol % or more, the toughness of the modified polyvinyl acetal resin is sufficiently high, leading to favorable strength of a crosslinked product to be obtained. With the hydroxy group content of 35 mol % or less, the polarity of the modified polyvinyl acetal resin is not too high, so that troubles such as cracking in the crosslinked product to be obtained are reduced, and peeling properties are favorable.

The acetyl group content of the modified polyvinyl acetal resin is not particularly limited. The lower limit thereof is preferably 0.0001 mol %, and the upper limit is preferably 5 mol %.

The degree of polymerization of the modified polyvinyl acetal resin is not particularly limited. The lower limit thereof is preferably 200, and the upper limit thereof is preferably 4,500. With the degree of polymerization of the modified polyvinyl acetal resin of 200 or more, the modified polyvinyl acetal resin composition having sufficient viscosity can be obtained. With the degree of polymerization of the modified polyvinyl acetal resin of 4,500 or less, the solubility of the modified polyvinyl acetal resin into water is favorable to avoid too high a viscosity of the aqueous solution thereof, allowing the acetalization to sufficiently proceed. Moreover, the viscosity of a solution of the modified polyvinyl acetal resin dissolved in an organic solvent is not too high, and such a solution has favorable coating properties to show better handling performance when used for coating.

Examples of the method of producing the modified polyvinyl acetal resin include a method of acetalizing, by a conventionally known method, polyvinyl alcohol obtained by saponification of polyvinyl acetate that is prepared by copolymerization of a monomer having the imine structure and vinyl acetate. The examples further include a method of acetalizing, by a conventionally known method, polyvinyl alcohol having a constitutional unit with an amino group or an amide structure to introduce an imine structure. The examples further include a method of acetalizing, by a conventionally known method, modified polyvinyl alcohol having an imine structure which is prepared by post modification of polyvinyl alcohol having a constitutional unit with an amino group or an amide structure.

Moreover, an imine structure may be introduced by post modification of an unmodified polyvinyl acetal resin.

In other words, the modified polyvinyl acetal resin may be an acetalization product of polyvinyl alcohol having a constitutional unit with an amino group or an amide structure.

Preferred among these methods is a method of obtaining a modified polyvinyl acetal resin having an imine structure by acetalization of polyvinyl alcohol having a constitutional unit with an amino group or an amide structure. Especially in the case of employing such a method, addition of excessive amounts of an aldehyde and an acid catalyst can give an imine structure.

For example, addition of an acid catalyst in an amount of 1.0% by weight or more of the total amount of all the components is preferred.

In the case of employing such a method, the presence of the constitutional unit with an amino group or an amide structure and the constitutional unit with an imine structure can be confirmed by, for example, measuring the spectrum of an amino group (at around 1600 cm$^{-1}$) by FT-IR or measuring the spectrum of an imine structure (160 to 170 ppm) obtained by $^{13}$C-NMR.

The acetalization may be carried out by a known method, and is preferably carried out in a water solvent, a mixed solvent containing water and an organic solvent compatible with water, or an organic solvent.

The organic solvent compatible with water may be, for example, an alcoholic organic solvent.

Examples of the organic solvent include: alcoholic organic solvents such as methanol, ethanol, n-propanol, isopropanol, n-butanol, and tert-butanol; aromatic organic solvents such as xylene, toluene, ethylbenzene, and methyl benzoate; aliphatic ester solvents such as methyl acetate, ethyl acetate, butyl acetate, methyl propionate, ethyl propionate, methyl butyrate, ethyl butyrate, methyl acetoacetate, and ethyl acetoacetate; ketone solvents such as acetone, methyl ethyl ketone, methyl isobutyl ketone, cyclohexanone, methylcyclohexanone, benzophenone, and acetophenone; lower paraffinic solvents such as hexane, pentane, octane, cyclohexane, and decane; ether solvents such as diethyl ether, tetrahydrofuran, ethylene glycol dimethyl ether, ethylene glycol diethyl ether, and propylene glycol diethyl ether; amide solvents such as N,N-dimethylformamide, N,N-dimethylacetamide, N-methylpyrrolidone, and acetanilide; and amine solvents such as ammonia, trimethylamine, triethylamine, n-butylamine, di-n-butylamine, tri-n-butylamine, aniline, N-methyl aniline, N,N-dimethyl aniline, and pyridine. These solvents may be used alone, or two or more types of these solvents may be used in combination. Particularly preferred among these are ethanol, n-propanol, isopropanol, and tetrahydrofuran in terms of the solubility in resin and simplicity of purification thereof.

The acetalization is preferably carried out in the presence of an acid catalyst.

The acid catalyst is not particularly limited, and examples thereof include mineral acids such as sulfuric acid, hydrochloric acid, nitric acid, and phosphoric acid; carboxylic acids such as formic acid, acetic acid, and propionic acid; and sulfonic acids such as methanesulfonic acid, ethanesulfonic acid, benzenesulfonic acid, and p-toluenesulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization is not limited, and examples thereof include aliphatic aldehydes such as formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde; and aromatic aldehydes such as benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. These aldehydes may be used alone, or two or more types thereof may be used in combination. Preferred among these aldehydes are butyraldehyde, 2-ethylhexylaldehyde, and n-nonylaldehyde, and more preferred is butyraldehyde because they are excellent in acetalization reactivity and can give a sufficient internal plasticization effect to the resin to be prepared to impart favorable flexibility.

The amount of the aldehyde can be appropriately determined in accordance with the desired degree of acetalization of the modified polyvinyl acetal resin. The amount of the aldehyde may be appropriately determined in accordance with the desired degree of acetalization of the modified polyvinyl acetal resin. In particular, the amount is preferably 60 to 95 mol %, more preferably 70 to 90 mol % relative to 100 mol % of the polyvinyl alcohol because the acetalization reaction can be carried out efficiently, and an unreacted aldehyde is easily removable.

In the modified polyvinyl acetal resin composition of the present invention, the lower limit of the amount of the modified polyvinyl acetal resin is preferably 0.5% by weight, and the upper limit thereof is preferably 70.0% by weight.

With the amount of the modified polyvinyl acetal resin of 0.5% by weight or more, the modified polyvinyl acetal resin composition used as an adhesive can show high toughness. With the amount of the modified polyvinyl acetal resin of 70.0% by weight or less, the modified polyvinyl acetal resin composition can show high adhesiveness.

The lower limit of the amount of the modified polyvinyl acetal resin is more preferably 1.0% by weight, and the upper limit thereof is more preferably 60.0% by weight.

The modified polyvinyl acetal resin composition of the present invention contains an epoxy resin.

Due to the incorporation of the epoxy resin, the modified polyvinyl acetal resin composition can be crosslinked by application of energy by heating or the like to achieve high adhesiveness.

Examples of the epoxy resin include bisphenol A-type epoxy resins, bisphenol F-type epoxy resins, phenol novolac-type epoxy resins, cresol novolac-type epoxy resins, naphthalene type epoxy resins, biphenyl-type epoxy resins, dicyclopentadiene-type epoxy resins, and epoxy resins having an aliphatic group. Preferred among these are bisphenol A-type epoxy resins and epoxy resins having an aliphatic group.

The epoxy resins having an aliphatic group are not particularly limited, and examples thereof include monoglycidyl ethers, diglycidyl ethers, and cycloaliphatic epoxy resins.

Examples of the monoglycidyl ethers include butyl glycidyl ether, phenyl glycidyl ether, lauryl glycidyl ether, secondary butylphenol monoglycidyl ether, and cresyl glycidyl ether.

The diglycidyl ethers are not particularly limited, and examples thereof include 1,6-hexanediol diglycidyl ether, neopentyl glycol diglycidyl ether, polytetramethylene glycol diglycidyl ether, and propylene glycol diglycidyl ether. Preferred among these are neopentyl glycol diglycidyl ether and propylene glycol diglycidyl ether.

Examples of the cycloaliphatic epoxy resins include cycloaliphatic epoxy resins having a 4- to 7-membered cyclic aliphatic group. Specific examples thereof include 1,2:8,9 diepoxylimonene, 4-vinylcyclohexene monoxide, vinylcyclohexene dioxide, methylated vinylcyclohexene dioxide, (3,4-epoxycyclohexyl)methyl-3,4-epoxycyclohexyl carboxylate, bis-(3,4-epoxycyclohexyl)adipate, bis-(3,4-epoxycyclohexylmethylene)adipate, bis-(2,3-epoxycyclopentyl)ether, (2,3-epoxy-6-methylcyclohexylmethyl) adipate, and dicyclopentadiene dioxide.

These epoxy resins may be used alone, or two or more types of these may be used in combination. The epoxy resin may be optionally dissolved in water or an organic solvent such as alcohols before use.

In the modified polyvinyl acetal resin composition of the present invention, the lower limit of the amount of the epoxy resin is preferably 0.5% by weight, and the upper limit thereof is preferably 99.5% by weight.

With the amount of the epoxy resin of 0.5% by weight or more, the adhesiveness of the modified polyvinyl acetal resin composition can be further enhanced. With the amount of the epoxy resin of 99.5% by weight or less, the toughness of the modified polyvinyl acetal resin composition can be improved.

The lower limit of the amount of the epoxy resin is more preferably 1.0% by weight, and the upper limit thereof is more preferably 90.0% by weight.

In the modified polyvinyl acetal resin composition of the present invention, the lower limit of the amount of the modified polyvinyl acetal resin is preferably 0.5 parts by weight, and the upper limit thereof is 100 parts by weight, relative to 100 parts by weight of the epoxy resin.

With the amount of the modified polyvinyl acetal resin of 0.5 parts by weight or more, the modified polyvinyl acetal resin composition can have sufficient toughness. With the amount of the modified polyvinyl acetal resin of 100 parts by weight or less, the modified polyvinyl acetal resin composition can have sufficient adhesiveness.

The lower limit of the amount of the modified polyvinyl acetal resin is more preferably 1.0 part by weight, and the upper limit thereof is more preferably 80 parts by weight.

The modified polyvinyl acetal resin composition of the present invention may contain a crosslinking agent in addition to the modified polyvinyl acetal resin and the epoxy resin.

Examples of the crosslinking agent include: halohydrin compounds such as epichlorohydrin and epibromohydrin; halogen compounds such as 1,2-dichloroethane and 1,3-dichloropropane; isocyanate compounds such as hexamethylene diisocyanate; bisacrylamide compounds such as N,N'-methylenebisacrylamide and N,N'-ethylenebisacrylamide; urea compounds such as urea and thiourea; guanidine compounds such as guanidine and diguanide; dicarboxylic acid compounds such as oxalic acid and adipic acid; unsaturated carboxylic acid compounds such as acrylic acid and methacrylic acid; unsaturated carboxylic acid ester compounds such as methyl acrylate, methyl methacrylate, 2-ethylhexyl acrylate, isobutyl acrylate, butyl acrylate, 2-ethylhexyl methacrylate, isobutyl methacrylate, and butyl methacrylate; and aldehyde compounds including dialdehydes such as glyoxal, glutaraldehyde, malonaldehyde, succinaldehyde, adipaldehyde, phthalaldehyde, isophthalaldehyde, and terephthalaldehyde. These crosslinking agents may be used alone, or two or more types of these may be used in combination. The crosslinking agent may be optionally dissolved in water or an organic solvent such as alcohols before use.

The modified polyvinyl acetal resin composition of the present invention may further contain a curing agent, a curing accelerator, and an organic solvent.

Examples of the curing agent include dicyandiamide, imidazole compounds, aromatic amine compounds, phenol novolac resins and cresol novolac resins. Preferred among these is dicyandiamide.

Examples of the curing accelerator include imidazole compounds, phosphorus compounds, amine compounds, and organic metal compounds. Preferred among these are imidazole compounds.

The lower limit of the amount of the curing agent in the modified polyvinyl acetal resin composition of the present invention is preferably 0.5 parts by weight, more preferably 1.0 part by weight, and the upper limit thereof is preferably 30.0 parts by weight, more preferably 20 parts by weight, relative to 100 parts by weight of the epoxy resin.

The lower limit of the amount of the curing accelerator in the modified polyvinyl acetal resin composition of the present invention is preferably 0 parts by weight, more preferably 0.5 parts by weight, and the upper limit thereof is preferably 30 parts by weight, more preferably 20 parts by weight, relative to 100 parts by weight of the epoxy resin.

Examples of the organic solvent include: ketones such as acetone, methyl ethyl ketone, dipropyl ketone, and diisobutyl ketone; alcohols such as methanol, ethanol, isopropanol, and butanol; aromatic hydrocarbons such as toluene and xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate; methyl cellosolve, ethyl cellosolve, butyl cellosolve, terpineol, dihydroterpineol, butyl cellosolve acetate, butyl carbitol acetate, terpineol acetate, and dihydroterpineol acetate.

The lower limit of the amount of the organic solvent in the modified polyvinyl acetal resin composition of the present invention is preferably 0.5 parts by weight, more preferably 1.0 part by weight, and the upper limit thereof is preferably 50.0 parts by weight, more preferably 45.0 parts by weight, relative to 100 parts by weight of the epoxy resin.

The modified polyvinyl acetal resin composition of the present invention may contain additives such as a plasticizer and a dispersant within a range that the effect of the present invention is not impaired.

As the method of crosslinking the modified polyvinyl acetal resin composition of the present invention, a method by heating can be mentioned. In the case of thermally curing the modified polyvinyl acetal resin composition by heating, the heating temperature is not particularly limited, and is preferably 50° C. to 170° C. With the heating temperature of 50° C. or higher, crosslinking can proceed sufficiently to give favorable strength. With the heating temperature of 170° C. or lower, the modified polyvinyl acetal resin is not thermally degraded to show its properties sufficiently. The lower limit of the heating temperature is more preferably 60° C., and the upper limit thereof is more preferably 150° C.

Though not particularly limited, the lower limit of the heating time is preferably 5 minutes and the upper limit thereof is preferably 10 hours. With the heating time of 5 minutes or longer, crosslinking can proceed sufficiently to give sufficient strength. With the heating time of 10 hours or shorter, the modified polyvinyl acetal resin is not thermally degraded to show its properties sufficiently.

The modified polyvinyl acetal resin composition of the present invention can be suitably used for applications in which conventional polyvinyl acetal resins have been used. For example, it can be used to obtain coating solutions for producing ceramic molded articles, metal pastes, heat-developing photosensitive materials, coating compositions, ink, and reflective sheets. The modified polyvinyl acetal resin composition of the present invention can be also used as an adhesive such as an adhesive for films used in display devices, an interlayer adhesive for ceramic laminates, and a structure adhesive for automobiles and buildings.

Moreover, the modified polyvinyl acetal having an imine structure used in the modified polyvinyl acetal resin composition of the present invention is excellent in self-crosslinkability, contributing to production of a molded article having high strength.

Advantageous Effects of Invention

The present invention can provide a modified polyvinyl acetal resin composition that is excellent in storage stability, has high strength and excellent adhesiveness, and is capable of reducing occurrence of warping or peeling when used for bonding different materials.

DESCRIPTION OF EMBODIMENTS

The present invention is more specifically described in the following with reference to, but not limited to, the following examples.

Example 1

An amount of 240 g of polyvinyl alcohol having a degree of polymerization of 600 and a degree of saponification of 99.7 mol % and containing 1.7 mol % of a constitutional unit with an amino group (—$NH_2$) represented by the above formula (3) was added to 1,800 g of pure water, and stirred at 90° C. for about two hours to be dissolved. The solution was cooled to 40° C., and to the solution were added 170 g of hydrochloric acid having a concentration of 35% by weight and 275 g of n-butyraldehyde. The acetalization reaction was carried out to precipitate a reaction product by maintaining the solution temperature at 40° C.

Then, the reaction solution was held to maintain the temperature at 40° C. for three hours, thereby completing the reaction. A modified polyvinyl acetal resin powder was obtained through neutralization, washing with water, and drying by normal methods.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with an amino group represented by the above formula (3) (amount: 0.2 mol %) and the constitutional unit with an imine structure represented by the following formula (5) (amount: 1.5 mol %, in the formula (5), $R^3$ is a hydrogen atom and $R^4$ is an n-butyl group).

Table 1 shows the degree of butyralization, acetyl group content, and hydroxy group content measured by $^{13}$C-NMR.

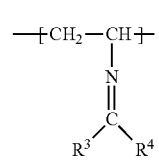

(5)

A polyvinyl acetal resin solution was prepared by dissolving 10 g of the obtained modified polyvinyl acetal resin in 90 g of a mixed solvent prepared by mixing toluene and ethanol at a weight ratio of 1:1.

To the obtained polyvinyl acetal resin solution was added 90 g of neopentyl glycol diglycidyl ether (epoxy equivalent: 108, molecular weight: 216), thereby preparing a resin composition containing a polyvinyl acetal resin and an epoxy resin mixed at a weight ratio of 10:90.

The obtained resin composition was applied to a release-treated polyethylene terephthalate (PET) film to a dry thickness of 20 μm, and dried at 125° C. to prepare a resin sheet.

Example 2

A modified polyvinyl acetal resin was obtained in the same manner as in Example 1, except that the polyvinyl alcohol used was changed to 240 g of polyvinyl alcohol having a degree of polymerization of 600 and a degree of saponification of 99.7 mol % and containing 16.0 mol % of a constitutional unit with an amino group represented by the above formula (3), and the amount of n-butyraldehyde was changed to 224 g.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with an amino group represented by the above formula (3) (amount: 0.2 mol %) and the constitutional unit with an imine structure represented by the above formula (5) (amount: 15.8 mol %, in the formula (5), $R^3$ is a hydrogen atom and $R^4$ is an n-butyl group).

Table 1 shows the degree of butyralization, acetyl group content, and hydroxy group content measured by $^{13}$C-NMR.

A polyvinyl acetal resin solution, a resin composition, and a resin sheet were produced using the obtained modified polyvinyl acetal resin in the same manner as in Example 1.

Example 3

A modified polyvinyl acetal resin was obtained in the same manner as in Example 1, except that the polyvinyl alcohol used was changed to 240 g of polyvinyl alcohol having a degree of polymerization of 600 and a degree of saponification of 99.7 mol % and containing 0.5 mol % of a constitutional unit with an amino group represented by the above formula (3), and the amount of n-butyraldehyde was changed to 280 g.

The obtained modified polyvinyl acetal resin was dissolved in DMSO-$d_6$ (dimethylsulfoxide), and analyzed by $^{13}$C-NMR (nuclear magnetic resonance spectrum) to confirm the presence of the constitutional unit with an amino group represented by the above formula (3) (amount: 0.0 mol %) and the constitutional unit with an imine structure represented by the above formula (5) (amount: 0.5 mol %, in the formula (5), $R^3$ is a hydrogen atom and $R^4$ is an n-butyl group).

Table 1 shows the degree of butyralization, acetyl group content, and hydroxy group content measured by $^{13}$C-NMR.

A polyvinyl acetal resin solution, a resin composition, and a resin sheet were produced using the obtained modified polyvinyl acetal resin, in the same manner as in Example 1.

Example 4

A polyvinyl acetal resin solution, a resin composition, and a resin sheet were produced in the same manner as in Example 1, except that 90 g of neopentyl glycol diglycidyl ether was changed to 90 g of a bisphenol A-type epoxy resin (jER 828 available from Mitsubishi Chemical Corporation, epoxy equivalent: 190, molecular weight: 380).

Example 5

A polyvinyl acetal resin solution, a resin composition, and a resin sheet were produced in the same manner as in Example 2, except that 90 g of neopentyl glycol diglycidyl ether was changed to 90 g of a bisphenol A-type epoxy resin (jER 828 available from Mitsubishi Chemical Corporation).

Example 6

A polyvinyl acetal resin solution, a resin composition, and a resin sheet were produced in the same manner as in Example 3, except that 90 g of neopentyl glycol diglycidyl ether was changed to 90 g of a bisphenol A-type epoxy resin (jER 828 available from Mitsubishi Chemical Corporation).

Examples 7 to 9

A polyvinyl acetal resin solution, a resin composition, and a resin sheet were produced in the same manner as in Example 1, except that the modified polyvinyl acetal resin obtained in Example 1 was used and an epoxy resin, a curing agent, and a curing accelerator were added as specified in Table 1.

The epoxy resin used was listed below.

Bisphenol F-type epoxy resin (jER 807 available from Mitsubishi Chemical Corporation, epoxy equivalent: 170)

Polypropylene glycol diglycidyl ether (EX-920 available from Nagase ChemteX Corporation, epoxy equivalent: 176)

Example 10

A polyvinyl acetal resin solution, a resin composition, and a resin sheet were produced in the same manner as in Example 2, except that 90 g of neopentyl glycol diglycidyl ether was changed to 90 g of a bisphenol F-type epoxy resin (jER 807 available from Mitsubishi Chemical Corporation).

Example 11

A polyvinyl acetal resin solution, a resin composition, and a resin sheet were produced in the same manner as in Example 3, except that 90 g of neopentyl glycol diglycidyl ether was changed to 90 g of a bisphenol F-type epoxy resin (jER 807 available from Mitsubishi Chemical Corporation).

Comparative Example 1

A polyvinyl acetal resin was obtained in the same manner as in Example 1, except that the polyvinyl alcohol was changed to polyvinyl alcohol having a degree of polymerization of 600 and a degree of saponification of 99.5 mol %.

The obtained polyvinyl acetal resin was dissolved in DMSO-$d_6$ (dimethylsulfoxide), and analyzed by $^{13}$C-NMR (nuclear magnetic resonance spectrum), failing to confirm the presence of a constitutional unit with an amino group or a constitutional unit with an imine structure.

Table 1 shows the degree of butyralization, acetyl group content, and hydroxy group content measured by $^{13}$C-NMR.

A polyvinyl acetal resin solution was produced by dissolving 30 g of the obtained polyvinyl acetal resin in a mixed solvent prepared by mixing toluene and ethanol at a weight ratio of 1:1.

A resin composition and a resin sheet were produced in the same manner as in Example 1, except that to the obtained polyvinyl acetal resin solution was added 70 g of neopentyl glycol diglycidyl ether and a resin composition was produced by mixing the polyvinyl acetal resin and an epoxy resin at a weight ratio of 30:70.

Comparative Examples 2 and 3

A polyvinyl acetal resin solution, a resin composition, and a resin sheet were produced in the same manner as in Example 1, except that the polyvinyl acetal resin obtained in Comparative Example 1 was used, and an epoxy resin, a curing agent, and a curing accelerator were added as specified in Table 1.

<Evaluation>

The polyvinyl acetal resin compositions and resin sheets obtained in the examples and comparative examples were evaluated for the following parameters. Table 2 shows the results.

(1) Gel Fraction

To about 0.1 g (w1) of a sample of a resin sheet was added 40 g of a mixed solvent prepared by mixing toluene and ethanol at a weight ratio of 1:1, and the mixture was stirred for 24 hours so that the sample was dissolved again. Then, solid-liquid separation was performed using a 200-mesh stainless-steel sieve whose mass (w2) was measured in advance. The stainless-steel sieve was taken out and vacuum-dried at 100° C. for one hour, followed by measurement of the mass (w3) thereof. The gel fraction was calculated using the following equation.

Gel fraction (%)={(w3−w2)/w1}×100.

The obtained gel fraction was evaluated based on the following criteria.

A higher gel fraction indicates higher curability.
∘∘ (Excellent): 80% or higher
∘ (Good): 40% or higher and lower than 80%
Δ (Average): 10% or higher and lower than 40%
x (Poor): Lower than 10%

(2) Storage Stability

An amount of 10 g of the resin composition was dissolved in 90 g of a mixed solvent prepared by mixing toluene and ethanol at a weight ratio of 1:1, thereby preparing a sample solution. The viscosity of the obtained sample solution was measured immediately after the preparation of the sample solution and a month later using a B-type viscometer to obtain the change rate of the solution viscosity. The obtained change rate was evaluated based on the following criteria.
∘∘ (Excellent): Lower than 10%
∘ (Good): 10% or higher and lower than 20%
Δ (Average): 20% or higher and lower than 30%
x (Poor): 30% or higher (3) Adhesive Force to a Base The obtained polyvinyl acetal resin composition was applied to various metal bases, and heated at 160° C. for 60 minutes to be cured. A cross-cut adhesion test was performed in conformity with JIS K 5400, and the number of grids on which the composition was remaining after the test was counted to evaluate the adhesive force to each base.

The metal bases used were an aluminum base, a stainless steel (SUS304) base, and a SPCC steel base.

With a higher adhesive force to a base, warping or peeling is less likely to occur upon curing.

(4) Tensile Modulus of Elasticity, Degree of Elongation, Yield Point Stress

The obtained resin sheet was peeled from the PET film, and the tensile modulus of elasticity (MPa), degree pf elongation (%), and yield point stress (MPa) of the peeled sheet were measured at a tensile speed of 20 mm/min by a method in conformity with JIS K 7113 using an autograph (AGS-1 available from Shimadzu Corporation).

(5) Shear Adhesive Force

The obtained polyvinyl acetal resin composition was applied to various metal bases, and heated at 160° C. for 60 minutes to be cured. The shear adhesive force thereof was measured under the conditions of a temperature of 20° C. to 30° C. and a tensile speed of 5 mm/min by a method in conformity with JIS K 6850.

The metal bases used were an aluminum base, a stainless steel (SUS304) base, and a SPCC steel base.

With a higher shear adhesive force, peeling is less likely to occur even under application of an external force, which indicates that the excellent adhesive force is achieved.

TABLE 1

| | Polyvinyl acetal resin | | | | | | |
|---|---|---|---|---|---|---|---|
| | Degree of polymerization | Degree of butylarization (mol %) | Acetyl group content (mol %) | Hydroxy group content (mol %) | Amount of constitutional unit with amino group (mol %) | Amount of constitutional unit with imine structure (mol %) | Adhesive composition Added amount of PVB (g) |
| Example 1 | 600 | 77.5 | 0.3 | 20.5 | 0.2 | 1.5 | 10 |
| Example 2 | 600 | 63.2 | 0.3 | 20.5 | 0.2 | 15.8 | 10 |
| Example 3 | 600 | 78.7 | 0.3 | 20.5 | 0 | 0.5 | 10 |
| Example 4 | 600 | 77.5 | 0.3 | 20.5 | 0.2 | 1.5 | 10 |
| Example 5 | 600 | 63.2 | 0.3 | 20.5 | 0.2 | 15.8 | 10 |
| Example 6 | 600 | 78.7 | 0.3 | 20.5 | 0 | 0.5 | 10 |
| Example 7 | 600 | 77.5 | 0.3 | 20.5 | 0.2 | 1.5 | 10 |
| Example 8 | 600 | 77.5 | 0.3 | 20.5 | 0.2 | 1.5 | 10 |
| Example 9 | 600 | 77.5 | 0.3 | 20.5 | 0.2 | 1.5 | 10 |
| Example 10 | 600 | 63.2 | 0.3 | 20.5 | 0.2 | 15.8 | 10 |
| Example 11 | 600 | 78.7 | 0.3 | 20.5 | 0 | 0.5 | 10 |
| Comparative Example 1 | 600 | 79.0 | 0.5 | 20.5 | 0.0 | 0.0 | 30 |
| Comparative Example 2 | 600 | 79.0 | 0.5 | 20.5 | 0.0 | 0.0 | 10 |
| Comparative Example 3 | 600 | 79.0 | 0.5 | 20.5 | 0.0 | 0.0 | 10 |

| | Adhesive composition | | | | | |
|---|---|---|---|---|---|---|
| | Epoxy resin (g) | | | | | |
| | Bisphenol A-type epoxy resin | Bisphenol F-type epoxy resin | Neopentyl glycol diglycidyl ether | Polypropylene glycol diglycidyl ether | Curing agent (g) dicyandiamide | Curing accelerator (g) Imidazole compound |
| Example 1 | — | — | 90 | — | — | — |
| Example 2 | — | — | 90 | — | — | — |
| Example 3 | — | — | 90 | — | — | — |
| Example 4 | 90 | — | — | — | — | — |
| Example 5 | 90 | — | — | — | — | — |
| Example 6 | 90 | — | — | — | — | — |

TABLE 1-continued

| | | | | | | |
|---|---|---|---|---|---|---|
| Example 7 | 75 | — | — | 10 | 3 | 2 |
| Example 8 | — | 75 | — | 10 | 3 | 2 |
| Example 9 | — | 90 | — | — | — | — |
| Example 10 | — | 90 | — | — | — | — |
| Example 11 | — | 90 | — | — | — | — |
| Comparative Example 1 | — | — | 70 | — | — | — |
| Comparative Example 2 | 75 | — | — | 10 | 3 | 2 |
| Comparative Example 3 | — | 75 | — | 10 | 3 | 2 |

TABLE 2

| | Evaluation | | | | | | | | | |
|---|---|---|---|---|---|---|---|---|---|---|
| | | | Adhesive force to base (number) | | | Strength of composition | | | Shear adhesive force (N/300 mm$^2$) | | |
| | Gel fraction | Storage stability | Aluminum | SUS 304 | SPCC steel | Tensile modulus of elasticity (Mpa) | Degree of elongation (%) | Yield point stress (Mpa) | Aluminum | SUS 304 | SPCC steel |
| Example 1 | ○ | ○ | 6 | 6 | 6 | 1000 | 40 | 75 | 800 | 1000 | 1000 |
| Example 2 | ○○ | ○ | 10 | 10 | 10 | 1200 | 30 | 85 | 1200 | 1400 | 1400 |
| Example 3 | ○ | ○ | 4 | 6 | 6 | 900 | 50 | 70 | 800 | 1200 | 1200 |
| Example 4 | ○ | ○ | 6 | 6 | 6 | 1200 | 30 | 85 | 1300 | 1500 | 1550 |
| Example 5 | ○○ | ○ | 10 | 10 | 10 | 1350 | 25 | 90 | 1550 | 1800 | 1850 |
| Example 6 | ○ | ○ | 6 | 4 | 4 | 950 | 46 | 70 | 1000 | 1300 | 1300 |
| Example 7 | ○○ | ○ | 10 | 10 | 10 | 1500 | 25 | 90 | 4000 | 4800 | 5000 |
| Example 8 | ○○ | ○ | 10 | 10 | 10 | 1700 | 15 | 90 | 4200 | 5000 | 5200 |
| Example 9 | ○ | ○ | 6 | 6 | 6 | 1300 | 35 | 85 | 1300 | 1500 | 1600 |
| Example 10 | ○ | ○○ | 10 | 10 | 10 | 1400 | 35 | 95 | 1450 | 1750 | 1900 |
| Example 11 | ○ | ○ | 6 | 4 | 4 | 1000 | 55 | 80 | 1000 | 1300 | 1300 |
| Comparative Example 1 | X | ○○ | 2 | 4 | 4 | 500 | 10 | 55 | 300 | 500 | 500 |
| Comparative Example 2 | X | ○○ | 4 | 4 | 4 | 1000 | 5 | 60 | 600 | 800 | 850 |
| Comparative Example 3 | X | ○○ | 4 | 6 | 6 | 1200 | 5 | 65 | 650 | 800 | 850 |

INDUSTRIAL APPLICABILITY

The present invention can provide a modified polyvinyl acetal resin composition that is excellent in storage stability, has high strength and excellent adhesiveness, and is capable of reducing warping or peeling when used for bonding different materials.

The invention claimed is:

1. A modified polyvinyl acetal resin composition comprising:
   a modified polyvinyl acetal resin having a constitutional unit with an imine structure, and
   an epoxy resin,
   wherein the amount of the constitutional unit with an imine structure in the modified polyvinyl acetal resin is 0.1 to 20.0 mol % relative to the modified polyvinyl acetal resin.

2. The modified polyvinyl acetal resin composition according to claim 1,
   wherein the modified polyvinyl acetal resin further has a constitutional unit with an amino group or an amide structure.

3. The modified polyvinyl acetal resin composition according to claim 2,
   wherein the modified polyvinyl acetal resin has an amino group or an amide structure, and an imine structure in a side chain.

4. The modified polyvinyl acetal resin composition according to claim 2,
   wherein the total amount of the constitutional unit with an imine structure and the constitutional unit with an amino group or an amide structure in the modified polyvinyl acetal resin is 0.1 to 20 mol %.

5. The modified polyvinyl acetal resin composition according to claim 1,
   wherein the modified polyvinyl acetal resin has a degree of acetalization of 60 to 90 mol %.

6. The modified polyvinyl acetal resin composition according to claim 1,
   wherein the modified polyvinyl acetal resin is an acetalization product of polyvinyl alcohol having a constitutional unit with an amino group or an amide structure.

7. The modified polyvinyl acetal resin composition according to claim 1,
   wherein the amount of the constitutional unit with an imine structure in the modified polyvinyl acetal resin is 0.5 to 20.0 mol % relative to the modified polyvinyl acetal resin.

8. The modified polyvinyl acetal resin composition according to claim 1,
wherein the amount of the constitutional unit with an imine structure in the modified polyvinyl acetal resin is 1.0 to 20.0 mol % relative to the modified polyvinyl acetal resin.

\* \* \* \* \*